United States Patent Office 3,195,603
Patented July 20, 1965

3,195,603
PNEUMATIC TIRE AND PROCESS OF MANUFACTURE
Lavern James Ahles, Newark, and Joseph Zimmerman, Wilmington, Del., assignors to E. I. du Pont de Nemours and Company, Wilmington, Del., a corporation of Delaware
No Drawing. Filed Apr. 14, 1964, Ser. No. 359,761
7 Claims. (Cl. 152—359)

This is a continuation-in-part of our copending application Serial No. 160,240, filed December 18, 1961, now abandoned.

This invention relates generally to pneumatic tires and, more particularly, to a nylon-reinforced tire with substantially reduced "flat-spotting" properties.

"Flat-spotting" is a temporary phenomenon exhibited by tires reinforced with conventional nylon cords and is descriptive of the flatness which develops on the tire surface in contact with the road as a tire cools after use. When the tire is again placed in use, this flatness persists temporarily and a thumping sound is audible. The phenomenon has been attributed, at least in part, to such visco-elastic properties as the relatively low dimensional stability, low modulus, and high growth of conventional polyamide yarns.

It has long been recognized that any appreciable reduction in flat-spot depth would remove the principal objection to the otherwise highly advantageous use of nylon in tire reinforcement cords. Such a reduction has been accomplished with cords prepared from recently developed melt blends, such as the melt blend of polyhexamethylene adipamide (95–50%) and polyhexamethylene isophthalamide (5–50%) which has now been disclosed in British patent specification No. 918,637. Other particularly suitable nylons include the melt blends of polyhexamethylene adipamide (95–50%) with polyhexamethylene 5-t-butyl isophthalamide (5–50%), or with hexamethylene 5-t-butyl isophthalamide copolymerized with hexamethylene isophthalamide (5–50%), the hexamethylene isophthalamide component of the copolymer being 1.5–30% by weight of the copolymer. When fabricated into tires, such cords have visco-elastic properties corresponding to an acceptable flat-spot depth. However, when exposed to severe humidity conditions, either before or during the fabrication of tires, these cords lose some of their advantages over conventional nylon cords, probably due to a slight accumulation of moisture.

The most important object of the present invention is to provide a tire reinforced with substantially dry nylon cords prepared from the above-mentioned melt blends which cords are stabilized in their visco-elastic behavior.

A further important objective is the provision of improvements in and supplemental to the normal procedures followed in the fabrication of reinforced tires which improvements bring about the desired visco-elastic stabilization of the reinforcement cords.

These and other objectives are accomplished by curing a tire reinforced with cords prepared from the above-mentioned polyamide melt blends in a press at a temperature of from 270 to 300° F. and then heating the tire in an oven, the time-temperature relationship of the supplemental heating step being sufficient to give the cords an $f(E)$ of less than 15, a modulus at 75° C. of at least 20 grams per denier and a hot-to-cold modulus ratio of at least 0.5.

Where modulus is reported herein, it is the modulus of elasticity, i.e., the Young's modulus, of the cord. In the hot-to-cold modulus ratio, the moduli at 75° C. and 25° C. are employed. The $f(E)$ is a cord elongation factor which correlates with flat-spot depth. Where reported herein, $f(E)$ is computed from the expression $$f(E) = E_1(E_2 - E_1)$$

wherein $E_1$ is the cord elongation at 10 pounds tension at 25° C. and $E_2$ is the cord elongation at 10 pounds tension at 75° C.

In the various process modifications disclosed herein, the temperatures employed in the curing and post-curing or heating steps are generaly inverse to the elapsed time, i.e., for the longer curing time a lower curing temperature is used and for the shorter curing time a higher temperature is used.

Generally, the tire is partially cured in from 18–45 minutes at a temperature of from 250–300° F. and the remainder of the cure is accomplished in from 10–45 minutes at 275–350° F. with a tire inflation pressure of 30–50 p.s.i. The preferred process embodiment (Example II) involves a partial curing step in which the tire is treated in a conventional curing press at a temperature of about 290° F. for a period of about 20 minutes. The remainder of the cure is accomplished during a supplemental heating step in which the partially cured tire is inflated to a pressure of about 48 p.s.i., placed in an oven and heated to a temperature of about 300° F., under atmospheric pressure conditions, for a period of about 45 minutes. Another process modification (Example IV) involves the additional step of quench-curing the tire before its removal from the cure press by circulating cold water through the press platens. In this manner, the tire temperature is reduced to 220–80° F. in a period of from 60–180 minutes. When this modification is followed, the tire is partially cured for from 15–30 minutes at a temperature of 250–360° F., quenched-cured and then heated in an oven for from 15–60 minutes at a temperature of 250–350° F.

In process embodiments of the type described in Example I, a conventional curing step is followed by a supplemental curing step which is accomplished by heating the tire in an oven to a temperature of 225–310° F. for from ½ to 24 hours. Treatment at 225° F. for about 6 hours is preferred. The tire may either be inflated or uninflated.

In the following examples, the favorable results obtained in the practice of the above and other process embodiments with size 8.50–14 tires are recorded. Where flat-spot depth is reported, the value is obtained by measuring the unloaded out-of-roundness in mils of a tire heated to 170° F. Then the heated tire is loaded against a flat surface with 90% of the maximum permissible load specified in the 1962 Tire and Rim Association Yearbook and allowed to cool for two hours. The out-of-roundness is measured again and corrected for the over-all shrinkage of the tire. The difference between the two values is the flat-spot depth. In actual practice, riding characteristics are acceptable with a flat-spot depth of less than 160 mils, i.e., if the cords have an elongation factor $f(E)$ of less than 15.

EXAMPLE I

Two four-ply nylon tires are built with cords fabricated from filaments spun from an 80/20 blend by weight of polyhexamethylene adipamide and polyhexamethylene isophthalamide (British specification No. 918,537), conventionally cured in a press for 60 minutes at 295° F. and then post-cured by heating in an oven. Tire No. 1 was inflated to 22 p.s.i. before going into the oven. Tire No. 2 was uninflated. The relatively high flat-spot depth of the tires before treatment in the oven is attributed to the moisture content in the cords. Results are reported in Table I.

Table I

| Tire No. | Flat Spot before Post-curing (mils) | Post-curing Temp. (° F.) | Post-curing Time (mins.) | After Post-curing ||||
|---|---|---|---|---|---|---|---|
|  |  |  |  | $f(E)$ | Flat Spot (mils) | 75° C. Mod. | Mod. Ratio, Hot/Cold |
| 1 | 171 | 310 | 420 | 14.6 | 137 | 24 | 0.636 |
| 2 | 200 | 225 | 1,440 | 13.8 | 136 | 27 | 0.659 |

EXAMPLE II

A four-ply nylon tire is built with cords fabricated from filaments spun from an 80/20 melt blend by weight of polyhexamethylene adipamide and polyhexamethylene isophthalamide and then partially cured in a conventional curing press at a temperature of 282–297° F. for 20 minutes. This partially cured tire is placed, inflated to 48 pounds, in a 283–317° F. oven for 45 minutes. After this novel cure, the flat-spot depth is 140 mils, the cord's $f(E)$ value is 14.1, the 75° C. modulus is 25.0 and the hot-to-cold modulus ratio for the cords is 0.602.

This novel cure is repeated for a four-ply tire fabricated from filaments spun from an 80/20 blend by weight of polyhexamethylene adipamide and polyhexamethylene 5-t-butyl isophthalamide. After this cure, the $f(E)$ value is 13.8, the 75° C. modulus is 24.6 and the hot-to-cold modulus ratio for the cords is 0.75.

EXAMPLE III

A four-ply nylon tire, built with cords fabricated from filaments spun from an 80/20 melt blend of polyhexamethylene adipamide and polyhexamethylene isophthalamide, is low-temperature cured in a conventional curing press at 210° F. for 330 minutes. The flat-spot depth of the tire is 141 mils.

EXAMPLE IV

A four-ply nylon tire, built with cords fabricated from filaments spun from an 80/20 melt blend by weight of polyhexamethylene adipamide and polyhexamethylene isophthalamide, is partially cured in a conventional curing press at 280–297° F. for 20 minutes. Then the tire, kept in the mold, is quench cured down to 120° F. by circulating cold water through the press platens for 60 minutes. Then this quenched tire is inflated to 49 pounds per square inch and placed in an oven at 290° F. for 45 minutes. The flat-spot depth of the tire is 146 mils, the cord's $f(E)$ value is 14.3, the 75° C. modulus is 23.2, and the hot-to-cold modulus ratio for the cords is 0.584.

Although all of the exemplified tires were cured or partially cured in a press, it is also possible to accomplish that initial step with dielectric induction heating (Indian Rubber World 113, pages 505–507, January 1946, and Rubber Age 59, pages 429, 440, July 1946), or by radiation curing (Chemical & Engineering News, February 25, 1957, page 131).

Optimum curing is accomplished by maintaining maximum tension on the cords as they are cured since, at higher tensions, a lower $f(E)$ is assured; through reduced drum set; by precuring the bead zone; or by the use of unstretched cords (having a modulus below 40 g.p.d. at 25° C.) which cords are "hot stretched" during curing.

In all of the exemplified procedures, care must be taken to insure that the elastomer stock is relatively well cured with the cords under high tensions in order to prevent pulling, slipping, or shifting thereof. Thus, each process embodiment involves a first step of at least partially curing the green tires in a cure press. Similarly, the overall results are rendered more effective by the use of fast curing skim stock (with which a lower $f(E)$ is assured), ultra-accelerators such as tetramethylthiuram disulfide in concentrations ranging from 0.2–4% by weight of the elastomer stock, and by an optimum scorch time of from 1–5 minutes at 280° F. Although only four-ply tires have been exemplified, equivalent results can be obtained with other constructions, e.g., in a two-ply tire. It is apparent that other variations and modifications may be incorporated into the disclosed fabrication procedures without departing from the spirit of the present invention which is therefore intended to be limited only by the scope of the appended claims.

Having thus described the invention, what is claimed as new and desired to be secured by Letters Patent is:

1. A cured pneumatic tire reinforced with substantially dry cords consisting essentially of a nylon composition, said composition being selected from the group consisting of melt blends of polyhexamethylene adipamide with (1) polyhexamethylene isophthalamide, (2) polyhexamethylene 5-t-butyl isophthalamide or (3) a copolymer of hexamethylene 5-t-butyl isophthalamide and hexamethylene isophthalamide, said cords having an $f(E)$ of less than 15, a modulus at 75° C. of at least 20 grams/denier and a hot-to-cold modulus ratio of at least 0.5.

2. A pneumatic tire reinforced with substantially dry, visco-elastically stable cords fabricated from a melt blended polyamide, said cords being characterized visco-elastically by an $f(E)$ of less than 15, a modulus at 75° C. of at least 20 grams/denier, a hot-to-cold modulus ratio of at least 0.5 and a substantially reduced tendency toward flat spotting.

3. A process of curing pneumatic tires reinforced with cords consisting essentially of a nylon composition, said composition being selected from the group consisting of melt blends of polyhexamethylene adipamide with (1) polyhexamethylene isophthalamide, (2) polyhexamethylene 5-t-butyl isophthalamide or (3) a copolymer of hexamethylene 5'-t-butyl isophthalamide and hexamethylene isophthalamide, said process comprising the steps of: curing the tire in a press at a temperature of from 270–300° F.; and then heating said tire at a temperature of at least about 225° F., the time-temperature relationship of the heating step being sufficient to give said cords an $f(E)$ of less than 15.

4. In the production of tires reinforced with cords consisting essentially of a nylon composition, said composition being selected from the group consisting of melt blends of polyhexamethylene adipamide with (1) polyhexamethyleneisophthalamide, (2) polyhexamethylene 5-t-butyl isophthalamide or (3) a copolymer of hexamethylene 5-t-butyl isophthalamide and hexamethylene isophthalamide, the steps of: curing a tire in a cure press at a temperature of about 295° F. for about 60 minutes; inflating said tire after its removal from the press; and heating the inflated tire in an oven, the time-temperature relationship of the heating step being sufficient to give said cords an $f(E)$ of less than 15.

5. In the production of tires reinforced with cords consisting essentially of a nylon composition, said composition being selected from the group consisting of melt blends of polyhexamethylene adipamide with (1) polyhexamethylene isophthalamide, (2) polyhexamethylene 5-t-butyl isophthalamide or (3) a copolymer of hexamethylene 5-t-butyl isophthalamide and hexamethylene isophthalamide, the steps of: partially curing a tire in a core press at a temperature of about 290° F. for about 20 minutes; inflating the partially cured tire after removal from the press; and heating the inflated tire in an oven, the time-temperature relationship of the heating step being sufficient to give said cords an $f(E)$ of less than 15.

6. The process of claim 5 wherein the inflated tire is heated at a temperature of about 300° F. for about 45 minutes 7. The process of claim 5 wherein, before removal of the tire from the cure press, the press platens are cooled to a temperature of about 120° F. by the circulation of cold water therethrough.

References Cited by the Examiner
UNITED STATES PATENTS

| | | | |
|---|---|---|---|
| 3,002,228 | 10/61 | Salem et al. | 18—53 |
| 3,017,669 | 1/62 | Mikell | 18—53 |
| 3,039,838 | 6/62 | Waters et al. | 18—53 |

ARTHUR L. LA POINT, *Primary Examiner.*